Sept. 1, 1959     E. R. PRICE     2,902,006
FLUID PRESSURE SERVO-MOTOR
Filed May 23, 1957
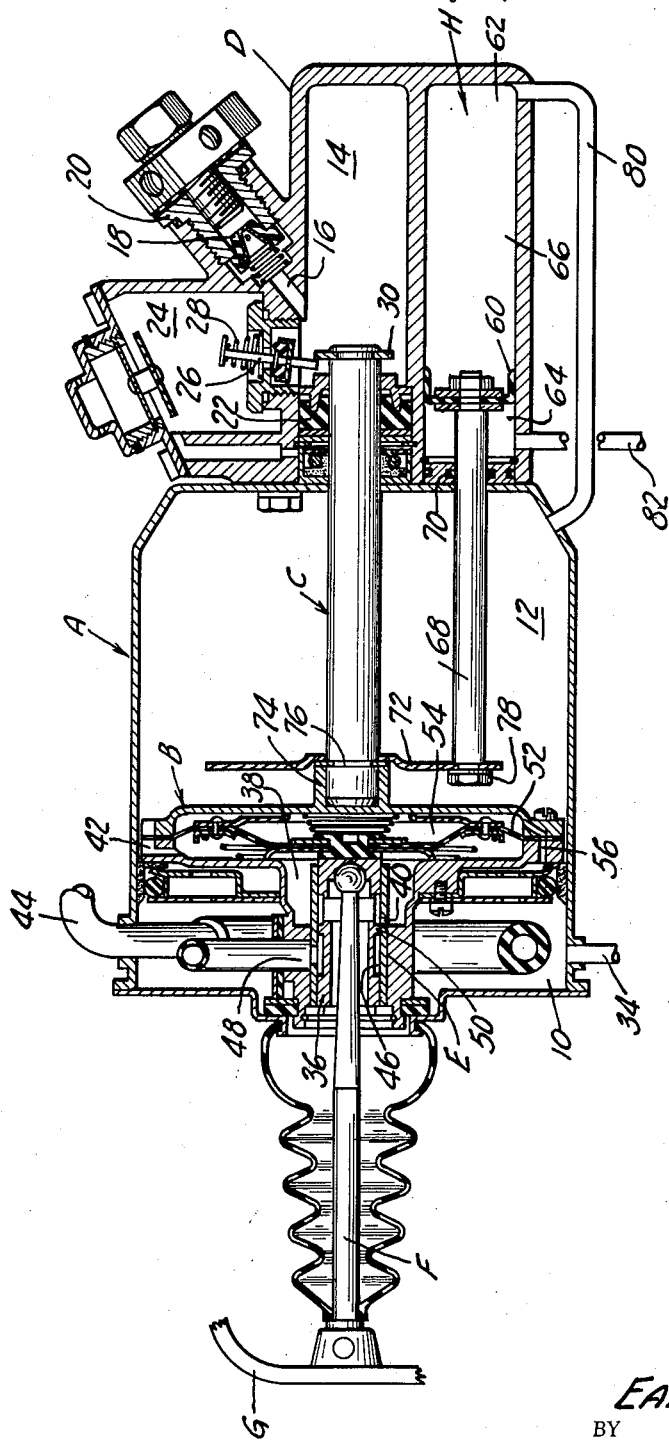
INVENTOR.
EARL R. PRICE
BY
William P. Hickey
ATTORNEY United States Patent Office 2,902,006
Patented Sept. 1, 1959

2,902,006

FLUID PRESSURE SERVO-MOTOR

Earl R. Price, South Bend, Ind., assignor to Bendix Aviation Corporation, South Bend, Ind., a corporation of Delaware Application May 23, 1957, Serial No. 661,234

2 Claims. (Cl. 121—38)

The present invention relates to fluid pressure servo-motors having movable elements which are normally biased to a retracted or predetermined position; and more particularly to fluid pressure servo-motors having fluid pressure means for causing the return of its movable elements to their normal retracted positions.

An object of the present invention is the provision of a new and improved fluid pressure servo-motor having pneumatic means for causing the return of its movable elements to their retracted positions; and which means will preferably not appreciably oppose the force developed by the fluid pressure servo-motors during a "full powered actuation of the unit."

A further object of the present invention is the provision of a new and improved servo-motor having means for the return of its movable elements to their normal retracted positions which means will not absorb and thereby diminish the maximum developed forces of which the servo-motor is capable.

The invention resides in certain constructions and combinations and arrangements of parts, and further objects and advantages of the invention will become apparent to those skilled in the art to which the invention relates from the following description of the preferred embodiment described with reference to the accompanying drawing forming a part of this specification.

There is shown in the drawing a fluid pressure servo-motor of the type used to actuate the hydraulic braking systems in automotive vehicles currently being manufactured. The unit generally comprises a power cylinder A having a power piston B therein, which divides the power cylinder into opposing fluid pressure chambers 10 and 12. Forces developed by the piston B are delivered to a force transmitting, or fluid displacement member C, the other end of which projects into a hydraulic master cylinder D bolted to one end of the power cylinder. The master cylinder D is provided with a fluid pressurizing chamber 14 into which the displacement member C extends and the outlet passageway of the chamber 14 is counterbored from the outside to receive a back pressure valve 18 which is seated against and held in place by a tubing adapter 20 to which the braking system of the vehicle is connected. A suitable hydraulic seal 22 is provided between the fluid displacement member C and the side walls of the fluid pressurizing chamber 14 to close off the end of the chamber adjacent the power cylinder A.

A reservoir 24 is integrally cast within the master cylinder D for the purpose of holding a reserve of liquid which can be used to replace liquid lost due to leakage during operation in the system. A compensating valve 26 of the tilt valve type is positioned between the reservoir 24 and the fluid pressurizing chamber 14 to control communication between the chambers. The compensating valve 26 is normally biased to its closed position by a coil spring 28; and the compensating valve 26 is opened when the fluid displacement member C is in its retracted position by a suitable flange or washer 30 mounted on the displacement member C for abutment with the lower end of the tilt valve stem as the fluid displacement member C approaches its retracted position. Communication between the reservoir 24 and the fluid pressurizing chamber 14 only occurs therefore when the braking system is in its normal released condition.

Actuation of the unit is controlled by means of a slide valve structure E mounted in the front face of the power piston B in such manner as to be actuated by means of the push rod F connected to the foot pedal lever G of the vehicle. When the foot pedal lever G is in the limit of its travel closest to the operator (when biased to the left as seen in the drawing) air pressure from the tube 34 passes through the opposing chamber 10, past the forward end of the piston B into the forward open end of the tubular slide 36 of the valve. Air pressure then enters the control chamber 38 through suitable cooperating porting 40 in the slide 36 and the cooperating side walls of the power piston B which porting in the normal released condition of the valve is as shown in the drawing. The control chamber 38 is communicated directly with the opposing chamber 12 through a suitable passageway 42 in the power piston B to, at this time, establish atmospheric pressure on opposite sides of the power piston B.

When the operator presses the foot pedal lever G, vacuum from the engine of the vehicle enters through the vacuum tube 44 and thence passes through a vacuum port 48 in the side walls of the valve structure to a recess 46 in the outer periphery of the slide 36. Inward movement of the tubular slide 36, as caused by the actuation of the foot pedal lever G, moves the land 50 past the port 40 to close off the atmospheric supply to the port 40 and thereafter communicate the vacuum recess 46 with the control valve chamber 38. This of course decreases the pressure within the opposing fluid pressure chamber 12 of the servo-motor A.

Reaction against the actuating movement of the slide valve structure E is provided in the present instance by means of a diaphragm 52 mounted within the power piston B in a manner separating the control chamber 38 from a rearwardly positioned atmospheric chamber 54 which is at all times communicated with the front opposing chamber 10 by means of the passageway 56 in the power piston B. Equal and opposite force will therefore be generated by the diaphragm 52 which will oppose valve actuating movement; and it will be readily understood, that the power piston B will exert a force on the fluid displacement member C that is generally proportional to the amount of force applied to the foot pedal lever G. For a more complete understanding of the construction and operation of the device so far described, reference may be had to the Earl R. Price application 411,386, which is now Patent Number 2,818,710.

It will be noted that in the devices of the prior art, of which the above referred to Price patent is an example, return springs are utilized to bias the movable elements of the servo-motor to their normal or retracted positions. The springs must be powerful enough to overcome the friction generated in the various seals of the unit, and must be capable of overcoming the friction of the seals when the spring means is in its extended position. It is a property of such spring means that the force required to fully compress the spring means increases as the spring means approaches its collapsed condition; such that a considerably greater amount of force must be delivered by the power piston to compress the spring means at the end of the power piston stroke than is required at the start of the power piston stroke. A sizeable amount of the force developed by the power piston B is therefore used, in the prior art devices, for the compression of their return spring means; and the force so used represents energy developed by the servo-motor but which cannot be used to actuate its driven device.

According to the provisions of the present invention, there is provided return means for the movable elements of the servo-motor which will be at a maximum when required to return the movable elements to their retracted positions, but which will not absorb energy from these movable elements during a complete, or full power actuation of the servo-motor. The device shown in the drawing comprises a pneumatically actuated return motor H mounted at one end of the servo-motor A in such manner that its movable wall or piston 60 may provide a return movement for the power piston B. The piston 60 is reciprocable within a return motor chamber 62 which is divided into opposing fluid pressure chambers 64 and 66 by the return motor piston 60. Movement of the return motor piston 60 is delivered to the fluid displacement member C, and the power piston B, by means of a piston rod 68 which passes through a suitable vacuum seal 70 in the end of the return motor chamber 62, and is connected with the fluid displacement member C by means of an abutment plate 72. The abutment plate 72 is provided with an annular area which surrounds the displacement member C, and which is held into engagement with a snap ring 76 on the displacement member C adjacent an integrally cast boss 74 on the rear of the power piston B. Any suitable means can be utilized to fix the piston rod 68 to the abutment plate 72, and a threaded nut and lock washer 78 are shown provided in the drawing.

Actuation of the return motor piston 60 is accomplished in such manner that full differential pressure is applied across the piston 60 when the movable elements of the fluid pressure servo-motor are required to be biased to their retracted positions; and in such manner that no pressure differential will be experienced across the piston 60 when full pressure differential is delivered across the power piston B. This is accomplished in the device shown in the drawing by communicating the opposing fluid pressure chamber 12, whose pressure is controlled by the slide valve E, with the correspondingly positioned opposing chamber 66 of the return motor by means of a valve free flow conducting passageway 80. Differential pressure across the piston 60 of the return motor is provided by a vacuum connection 82 which is preferably connected to the same source of vacuum as is utilized to supply vacuum to the vacuum supply 44 for the power cylinder A. It will be seen that, in the embodiment shown in the drawing, vacuum is supplied to the opposing chamber 64 of the return motor which corresponds in position to the opposing chamber 10 of the power cylinder A into which atmospheric pressure is continually admitted.

In the normal or non-actuating condition of the fluid pressure servo-motor, atmospheric pressure is of course supplied to the opposing chamber 12 of the power cylinder A; and is thence supplied to the rear opposing return motor chamber 66. As previously indicated, full vacuum is continually supplied to the front opposing return motor chamber 64; such that a full vacuum to air differential pressure is supplied across the piston 60 of the return motor H to develop the maximum force of which the return motor is capable. This force, is of course, delivered to the movable element of the power cylinder A; such that a maximum of restoring force is delivered to these movable elements to bias them to their normal or retracted positions.

During actuation of the fluid pressure servo-motor, vacuum is, of course, admitted to the rear opposing chamber 12 of the power cylinder, and is hence supplied to the rear opposing chamber of the return motor H to thereby decrease the restoring force developed across the piston 60 of the return motor H. During a complete power application of the servo-motor unit, full vacuum will be supplied to the rear opposing chamber 12 to thereby develop the maximum pressure differential across the power piston B of which the unit is capable. At the same time, full vacuum will be admitted to the rear opposing chambers 66 of the return motor H, thereby supplying full vacuum to both of the opposing chambers of the return motor; such that no opposing return force is delivered under these conditions to the movable elements of the fluid pressure servo-motor. It will therefore be seen that the present invention provides means for returning the movable elements of the servo-motor without absorbing some of the forces developed by the servo-motor during a full power application of the unit.

While the invention has been described as embodied in a fluid pressure servo-motor which utilizes the atmospheric pressure as one of its fluid pressure sources and vacuum as the other of its fluid pressure sources, the invention is not so limited. Nor, is the positioning of the return motor H with respect to the power cylinder A to be considered as limited to the arrangement shown in the drawing.

While the invention has been described in considerable detail, I do not wish to be limited to the particular constructions and/or arrangements shown in the drawing; and it is my intention to cover hereby all adaptations, modifications and arrangements thereof which come within the practice of those skilled in the art to which the invention relates.

I claim:

1. A fluid pressure servo-motor for automotive braking systems and the like comprising: a power chamber; a first movable wall in said power chamber dividing said chamber into opposing chambers, said movable wall having a retracted position adjacent one end of said power chamber when pressure of equal intensity is experienced in said opposing chambers, a driven device constructed and arranged to be actuated upon movement of said movable wall from its retracted position, a source of high pressure, a source of low pressure, means continually communicating one of said pressure sources to one of said opposing chambers, valve means constructed and arranged to normally communicate said one of said pressure sources to the other of said opposing chambers when said movable wall is in its retracted position and to communicate said other of said pressure sources to said other of said opposing chambers when said valve means is actuated, a return motor chamber considerably smaller in diameter than said power chamber, a second movable wall in said return motor chamber operatively connected to said movable wall in said power chamber to move in synchronization therewith and dividing said return motor chamber into opposing return motor chambers one of which expands and the other of which contracts as said movable walls move out of their retracted positions, first conduit means continually communicating the other of said pressure sources to one of said opposing chambers of said return motor chamber, and second conduit means continually communicating the other of said opposing chambers of said return motor chamber to said other opposing chamber of said power chamber, said second conduit means being free of valving.

2. A fluid pressure servo-motor for automotive braking systems and the like comprising: a power chamber; a first movable wall in said power chamber dividing said chamber into first and second opposing power chambers spaced in opposite end directions from said movable wall, said movable wall having a retracted position adjacent one end of said power chamber when pressure of equal intensity is experienced in said opposing power chambers, a driven device constructed and arranged to be actuated upon movement of said movable wall from its retracted position, a source of high pressure, a source of low pressure, means continually communicating one of said pressure sources to said first opposing chamber of said power chamber, valve means constructed and arranged to normally communicate said one of said high and low pressure sources to said second opposing chamber when said movable wall is in its retracted position and to communicate said other of said pressure sources to said second opposing chamber when said valve means is actuated, a return motor chamber at one end of said power chamber, said return motor chamber being considerably smaller in diameter than said power chamber, a second movable wall in said motor chamber dividing said motor chamber into opposing first and second return motor chambers spaced in the respective end directions in which said first and second opposing power chambers are spaced relative to their movable wall, said movable wall in said return motor chamber having a retracted position adjacent its end corresponding in position to the retracted end position of said first movable wall, and being operatively connected to said first movable wall to force it into its retracted position, means continually communicating the other of said pressure sources to said first opposing chambers of said return motor chamber and conduit means continually communicating said second opposing chamber of said power chamber to said second opposing chamber of said return motor, said conduit means being free of valving.

References Cited in the file of this patent
UNITED STATES PATENTS

| | | |
|---|---|---|
| 178,965 | Sellers | June 20, 1876 |
| 1,565,767 | Westbrook | Dec. 15, 1925 |
| 1,770,194 | Bragg | July 8, 1930 |
| 1,865,913 | Hynes | July 5, 1932 |
| 2,077,894 | Patrick | Apr. 20, 1937 |
| 2,652,033 | Shafer | Sept. 15, 1953 |
| 2,818,710 | Price | Jan. 7, 1958 |